April 30, 1940.  W. PAGE  2,199,269
INTERNAL EXPANDING BRAKE FOR VEHICLE WHEELS
Filed March 17, 1938
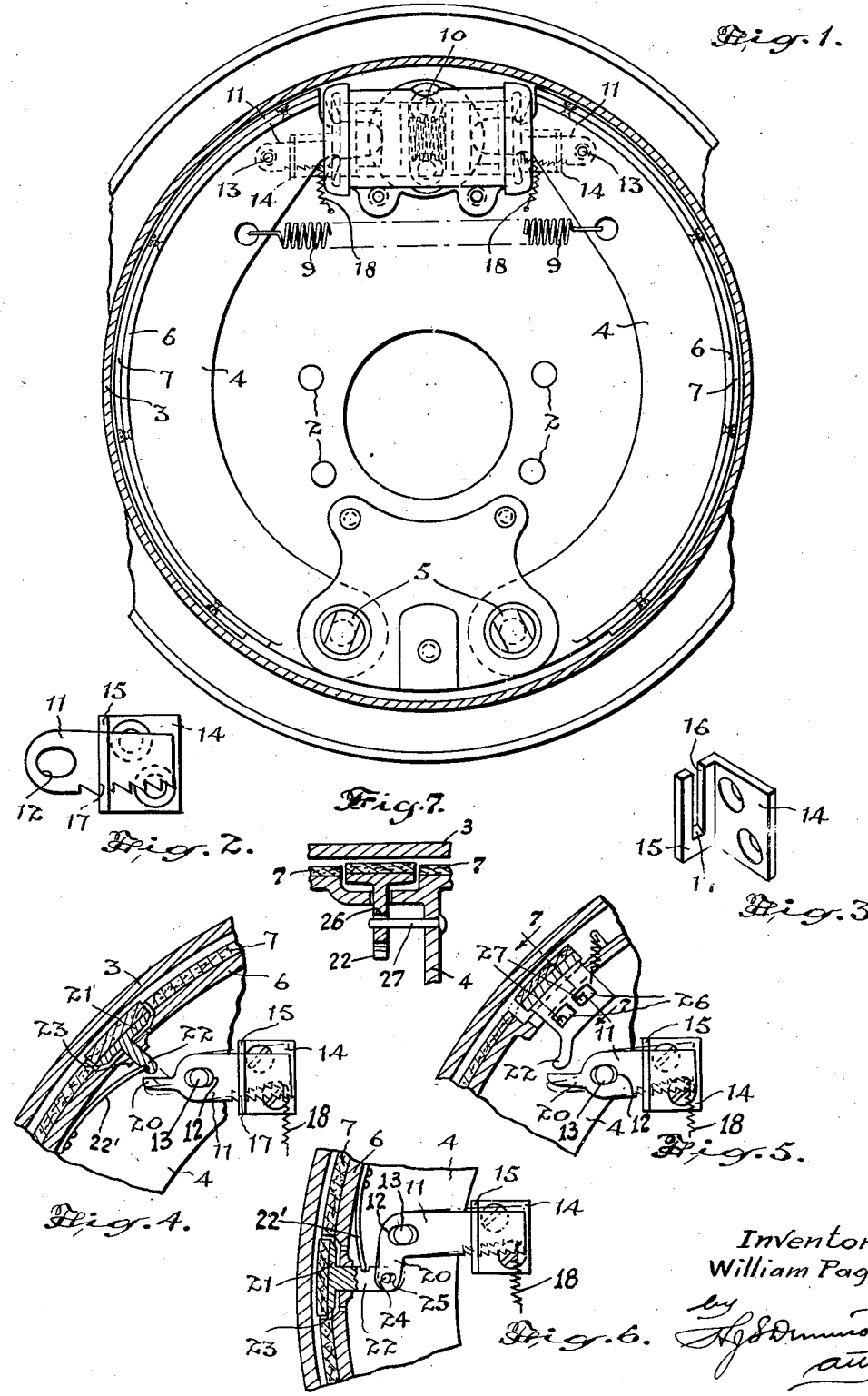
Inventor.
William Page.

Patented Apr. 30, 1940

2,199,269

UNITED STATES PATENT OFFICE 2,199,269

INTERNAL EXPANDING BRAKE FOR VEHICLE WHEELS

William Page, Parklands Post Office, Pa.

Application March 17, 1938, Serial No. 196,437
In Great Britain March 19, 1937

6 Claims. (Cl. 188—79.5)

The principal object of the invention is to provide means for automatically adjusting the position of the brake shoes in relation to the brake drum, limiting the motion of the shoes away from the drum and thereby providing compensation for wear of the brake linings in the operation of the brake mechanism.

A further and important object is to provide a structure which will enable an automatic retraction in the event of over-adjustment when the drum is expanded through heat to avoid dragging or locking of the shoes on contraction of the drum.

The principal features of the invention consist in the novel construction and arrangement of parts whereby a ratchet bar pivotally connected to the brake shoe and co-operating with a locking member to adjust the brake shoes is associated with a member mounted on the brake shoe adapted to automatically release the interlocking members to relieve over-adjustment of the shoes.

In the accompanying drawing

Figure 1 is an elevation of a brake mechanism employing pivoted brake shoes with the brake-adjusting device embodied therein.

Figure 2 is an elevation of the ratchet bar carried by the left hand shoe and the stationary ratchet plate with which it co-operates fixed on the stationary back-plate.

Figure 3 is a perspective view of the single toothed locking member.

Figures 4, 5 and 6 are modifications enabling an over-adjustment release.

Figure 7 is a fragmentary sectional view on the line 7—7 of Figure 5.

Referring to Figures 1 to 3, the circular back-plate 1 has holes 2 for bolts by which it is fixed in concentric relation with the brake drum flange 3 secured to the wheel of a vehicle. A pair of oppositely counterpart brake shoes 4 are pivotally supported on the bolts 5 carried by the back plate and are formed of sheet metal angle plates having an outer circular flange 6 provided on its periphery with friction linings of fabric 7 adapted to frictionally engage the inner surface of the brake drum flange 3. The shoes 4 are connected by the return spring 9 which stresses them to the retracted position and are operated by a fluid pressure device 10, but any other actuating means may be employed.

Each of the shoes 4 is pivotally or slidably connected with a ratchet bar 11 mounted through a closed slot 12 upon a headed stud 13 fixed on the web of the shoe 4. Each ratchet bar engages a locking member 14 consisting of a vertically disposed right-angled bracket piece having one side flange 15 with an open vertical slot 16 at the bottom of which is a single tooth 17, while the other side flange serves for attachment to the back-plate 1. The ratchet bar 11 extends through the slot 16 of the locking member 14 and engages by its toothed edge with the tooth 17 and is retained in engagement by a spring 18.

By virtue of the stud 13 on the brake shoe 4 having free play in the slot 12 of the ratchet bar 11, a relative movement of the brake shoe 4 with respect to the ratchet bar 11 is permitted so that said brake shoe can be advanced or retracted for normal braking purposes without affecting the position of the ratchet bar 11.

As the linings become thinner by wear upon the brake drum flange 6, the brake shoe 4 through its stud bearing against the outer end of the slot 12 of the ratchet bar 11 will eventually advance the latter so that it slips over the tooth 17 of the locking member 14 to the extent of a tooth. The brake shoe is thus detained in a slightly closer relation to the brake drum as a receding movement to its initial position is prevented by the tooth 17 of the locking member 14. Thus the minimum amount of clearance between the brake shoe linings and the drum to prevent disengagement when the linings are new is substantially maintained as the linings are worn and in compensation for such wear.

It is to be understood that the slot 16 in the locking member 14 need not necessarily be an open slot, as it may be a closed slot.

The locking member may have more than one tooth if desired.

The above detailed structure is set forth in my earlier United States Patent 2,036,074, granted March 31, 1936.

In the details shown in Figures 4, 5 and 6, according to the present invention, means are provided for retraction of the brake shoes from an over-adjusted position such as when the said shoes, having been advanced to a certain position for services when the drum is heated, are too near when the said drum contracts to give clearance.

In the form shown in Figure 4, the ratchet bar 11 has a short projection 20 beyond the pivoted end with which projection a plunger mounted on the shoe 4 engages. The plunger consists of a head 21 surmounted by friction lining and a shank 22, the head 21 lying in a recess 23 on the periphery of the shoes 4 but projecting slightly beyond the outer surface of the shoe lining while the shank 22 projects through the brake shoe and has a bifurcated end passing over the extended tail part 20 of the ratchet bar 11 but allowing clearance therefrom. Suitable spring means here shown as a leaf spring 22' may be interposed between the plunger and the shoe in order to return said plunger.

Normally, as the brake is applied, the shoe 4 moves towards the drum flange 3 and the plunger head 21 will be forced into the recess 23 but the shank 22 will not press on the ratchet bar extension as there is clearance between the latter and said shank. Now consider when the drum is heated and expanded so that the ratchet bar 11 has been advanced one tooth, as the drum cools and contracts, it will press against the plunger head 21 and depress the plunger so as to tip the ratchet bar 11 on its pivot 13 and raise it from the lock tooth 17. The shoe 4 is thereby allowed to retract from the drum under the action of the return spring 9 as said ratchet bar slides back to the next tooth whereupon said ratchet bar drops down to engaged relation with the lock tooth 17, and the plunger head 21 is once more permitted to project above the shoe 4 into normal position.

In the modification shown in Figure 5, the plunger has a side tang 22 adapted to abut against the extending tail end 20 of the ratchet bar 11, clearance being provided between said tang and the extended end 20 under normal conditions as aforesaid. The plunger is mounted through elongated holes 26 upon supports 27 fixed to the shoe whereby said plunger obtains a sliding lateral movement in a direction substantially peripherally of the drum by frictional engagement therewith enabling the tang 22 to definitely engage the tail end 20 of the ratchet bar 11.

On the modification shown in Figure 6, the shank 22 of the plunger is pivotally connected to a depending extension 20 of the ratchet bar 11 by a pin 24 on the shank engaging an elongated hole 25 in the said extension. The plunger may therefore be depressed without moving the ratchet bar 11.

The ratchet bar may be tapered to allow for the arc the shoe describes when moved forward and its teeth may be slightly rounded to facilitate interengagement with the locking tooth.

What I claim as my invention is:

1. In an internal expanding brake, the combination with a brake drum, a pivotal brake shoe co-operative with said drum and a ratchet wear take-up adjustment means for said brake shoe including a toothed locking member pivotally mounted on said shoe with the teeth at one side of the pivot and an operating extension at the other, of a member mounted on the brake shoe and extending beyond the friction surface thereof for engagement and displacement by the brake drum on contraction thereof on cooling following an over-adjustment of the ratchet adjustment means and having an inward extension co-operative with the operative extension of said toothed locking member in response to said displacement to swing same on its pivot to a position of dis-engagement and thereby restore normal clearance between the brake shoe and drum.

2. In an internal expanding brake, the combination with pivotal brake shoes, brake drum and backing plate, of wear-adjustment means comprising an arm mounted on each of said shoes each having a ratchet surface and an elongated orifice, a pin secured in each of said shoes and extending through the orifice of the respective ratchet arm, means on the backing plate for adjustably interlocking with said ratchet arms to maintain a close adjustment of the shoes relative to the drum in compensation for wear, and means carried by the brake shoes adapted to engage the brake drum and having sliding pivot connections with said ratchet arms to tilt and unlock the same in response to movement imparted to said latter means by the drum in contracting on cooling following an over-adjustment of said wear-adjustment means to thereby preserve a normal clearance between the brake shoes and drum.

3. In an internal expanding brake, the combination with a brake drum and pivotal brake shoes co-operative therewith each having a recess in the braking surface adjacent to the free end, of a plunger housed in each of said recesses having a drum-engaging surface and formed with a shank extending through the brake shoe, spring means for holding the drum-engaging surface of said plungers slightly beyond the friction surface of the brake shoes, wear-adjustment means for said shoes comprising a pivotal ratchet arm mounted adjacent to the inner side of each of said brake shoes and each having an extension, and locking members co-operating with said ratchet arms to hold the shoes in adjusted positions to compensate for wear, said plungers being adapted to engage said ratchet arm extensions in response to movement imparted thereto by contact of the drum with the drum-engaging surfaces thereof on contraction of the drum following an over-adjustment of said wear-adjustment means.

4. In an internal expanding brake, the combination with pivotal brake shoes and brake drum, of wear-adjustment means for said shoes comprising an arm mounted on each of said shoes, each arm having a ratchet surface and an elongated orifice, a pin secured in each of said shoes extending through the orifice of the respective ratchet arm, means having selective locking engagement with said ratchet arms to maintain said shoes in close adjustment relative to the drum in compensation for wear, and means for controlling said adjustment comprising plungers carried by the brake shoes having a loose pivotal connection at their inner ends with said ratchet arms and adapted to be engaged by the brake drum on cooling contraction of the latter and displaced thereby to tilt said ratchet arms to release same from said selective locking means following an over-adjustment of the wear-adjustment means to thereby preserve a normal clearance between said shoes and drum.

5. In a brake mechanism, the combination with a brake drum and brake shoes co-operative therewith, of means for adjusting the shoes to compensate for wear, and means carried by said shoes for releasing the adjusting means from over-adjustment upon contact with the brake drum including a member mounted for displacement peripherally of the drum when in frictional contact with the latter and co-operatively engageable with the brake drum on contraction of the latter due to cooling to preserve a normal clearance between the shoes and drum.

6. In an internal expanding brake, the combination with a brake drum, a backing plate and brake shoes co-operative with the drum, of wear-adjustment means for said shoes including a pair of toothed ratchet members for each shoe, one rigidly mounted on said backing plate and one on the shoe, the shoe-mounted ratchet member being displaceable in a plane transversely of the plane of disposition of the member mounted on the backing plate, and means for releasing said wear-adjustment means from over-adjustment comprising a member operatively engageable with the brake drum on cooling and contraction of the latter following an over-adjustment of the wear-adjusting means to displace said shoe-mounted member in said plane and effect the positive release of said ratchet members and restore normal clearance between the brake shoes and drum.

WILLIAM PAGE.